No. 841,283. PATENTED JAN. 15, 1907.
P. J. TJOSSEM.
SALT FEEDER.
APPLICATION FILED OCT. 6, 1905.

Witnesses.
R. W. Brockett
R. L. Spencer

Inventor P. J. Tjossem
By Ourig & Lane
Att'ys.

UNITED STATES PATENT OFFICE.

PORTES J. TJOSSEM, OF LEGRAND, IOWA.

SALT-FEEDER.

No. 841,283.  Specification of Letters Patent.  Patented Jan. 15, 1907.

Application filed October 6, 1905. Serial No. 281,634.

*To all whom it may concern:*

Be it known that I, PORTES J. TJOSSEM, a citizen of the United States, residing at Legrand, in the county of Marshall and State of Iowa, have invented a certain new and useful Salt-Feeder, of which the following is a specification.

The objects of my invention are to provide a device for feeding salt to animals, the containing-receptacle in which is capable of being rotated by the animals to which the salt is to be fed and is so constructed that as the containing-receptacle is rotated the salt will be fed between the slats of the receptacle and fall to the trough below, where it is accessible to the animals.

A further object is to provide a device of this kind which will reduce the lumps of salt held in the containing-receptacle to such a size that they will pass between the slats onto the trough beneath by the wearing of the lumps on the inside portions of the slats as the containing-receptacle is rotated.

A further object is to provide a cover or roof for the containing-receptacle which will keep rain and snow from the containing-receptacle and prevent the deterioration of the salt to a great extent.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
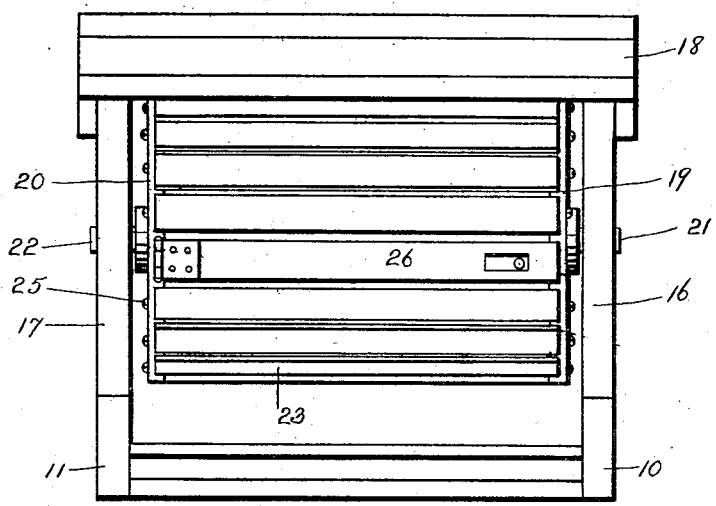
Figure 2:
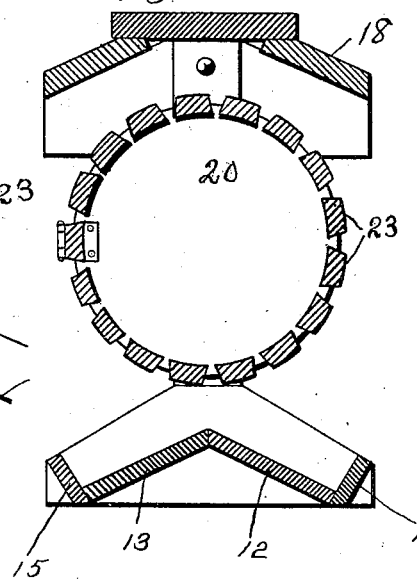
Figure 3:
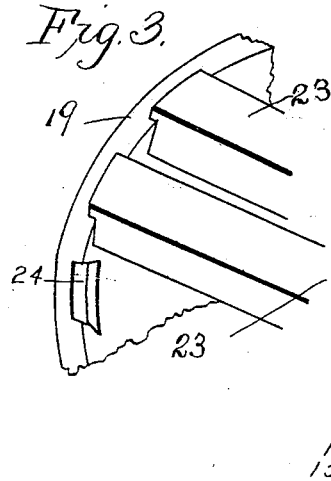
Figure 4:
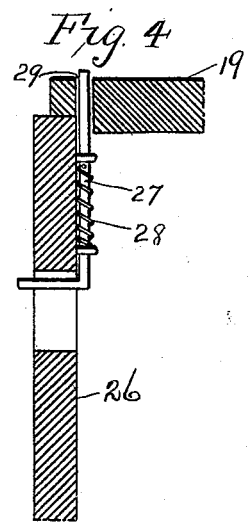

Figure 1 is a front elevation of the complete device. Fig. 2 is a vertical sectional view of the same. Fig. 3 is a detail perspective view showing the ends of two of the bars and the way in which they are secured to the disks which support them; and Fig. 4 is a sectional view of a portion of the hinged slat, showing the locking mechanism for securing the slat in its closed position.

Referring to the accompanying drawings, I have used the reference-numerals 10 and 11 to indicate the trough-supports, having a trough mounted between them, which trough has two inclined boards 12 and 13, forming their bottom portions, and also two upwardly-extending flanges 14 and 15, which are designed to receive the salt as it drops through the slats of the containing-receptacle, so that it can be easily obtained by the animals feeding from the trough. Secured to the standards 10 and 11 are the uprights 16 and 17. Connecting the upper ends of the uprights 16 and 17 is a roof 18, which is slightly wider and longer than the trough between the supports 10 and 11.

Rotatably mounted between the uprights 16 and 17 is a containing-receptacle, which is constructed as follows: A disk 19 forms one end of the containing-receptacle, and the disk 20 forms the other end thereof. Extending outwardly from the disk 19 and cast integral with it is an axle 21, designed to rotate in the upright 16. Extending outwardly from the disk 20 is an axle 22, designed to rotate in the upright 17. Connecting the disks 19 and 20 and arranged substantially equidistant from each other is a series of slats 23, which are set in depressions 24 in each of the disks 19 and 20. A number of screws 25 are passed through the disks 19 and 20 and into the end of each of the slats 23, with the exception of one of the slats, which I have for the sake of convenience numbered 26, which is hinged to the disk 20 and is designed to be held in position relative to the disk 19 by means of the sliding pin 27, which sliding pin is normally held in a closed position by means of the spring 28. This sliding pin 27 enters an opening 29 through the disk 19 and rigidly maintains the slat 26 in a closed position. When, however, it is desired to place salt in the containing-receptacle or to obtain access to the interior of the containing-receptacle for any reason, the sliding pin is moved rearwardly and the slat 26 swung outwardly on its hinge. Through the opening provided by swinging the slat 26 on its hinge access may be obtained to the interior of the receptacle, and salt may be easily poured into the containing-receptacle.

In practical use and assuming that the salt has been placed in the receptacle and the slat 26 fastened in a closed position by the sliding pin 27 the animals will approach the containing-receptacle and smelling the salt will lick the slats and cause the containing-receptacle to be rotated, which will allow the salt to fall through the slats of this receptacle onto the trough, where it can be easily obtained by the animal. By the constant rotation of the containing-receptacle the salt will be pulverized sufficiently to fall between the slats.

Having thus described my invention, what I claim, and desire to secure by Letters Patent of the United States therefor, is—

1. A trough, uprights extending upwardly from the ends of the trough, a roof secured to the upper ends of the uprights, and a rotatable containing-receptacle mounted between the uprights and beneath the roof.

2. A trough, uprights extending upwardly from the ends of the trough, a roof secured to the upper ends of the uprights, a rotatable containing-receptacle mounted between the uprights and beneath the roof, comprising two disks, axles on the disks designed to rotate on the uprights, and a series of slats arranged substantially equidistant from each other between the disks.

3. A trough, uprights extending upwardly from the ends of the trough, a roof secured to the upper ends of the uprights, a rotatable containing-receptacle mounted between the uprights and beneath the roof, comprising two disks, axles on the disks designed to rotate on the uprights, a series of slats arranged substantially equidistant from each other between the disks, a hinge secured to one of the slats and to one of the disks, and a sliding pin secured to the same slat as the hinge, for retaining it in a closed position.

4. In a device of the class described, a rotatably-mounted receptacle, slats in the receptacle, arranged substantially equidistant from each other, one of said slats capable of being opened to allow access to the interior of the receptacle, a roof mounted above the receptacle, and a trough mounted beneath the receptacle.

5. In a device of the class described, a rotatably-mounted receptacle, slats in the receptacle, arranged substantially equidistant from each other, one of said slats capable of being opened to allow access to the interior of the receptacle, the receptacle comprising two disks having slats partially inside and partially outside of their peripheries, and screws for maintaining each of the slats in position relative to the disks, said screws extending through the disks and into the ends of the slats.

PORTES J. TJOSSEM.

Witnesses:
A. N. FRENCH,
GEORG A. TURM,
A. GOODMONSON.